United States Patent
Sudhakar et al.

(10) Patent No.: US 10,540,179 B2
(45) Date of Patent: Jan. 21, 2020

(54) APPARATUS AND METHOD FOR BONDING BRANCH INSTRUCTION WITH ARCHITECTURAL DELAY SLOT

(71) Applicant: MIPS Tech, LLC, Santa Clara, CA (US)

(72) Inventors: Ranganathan Sudhakar, Santa Clara, CA (US); Parthiv Pota, Cupertino, CA (US)

(73) Assignee: MIPS Tech, LLC, Campbell, CA (US)

( * ) Notice: Subject to any disclaimer, the term of this patent is extended or adjusted under 35 U.S.C. 154(b) by 852 days.

(21) Appl. No.: 13/789,467

(22) Filed: Mar. 7, 2013

(65) Prior Publication Data
US 2014/0258694 A1 Sep. 11, 2014

(51) Int. Cl.
*G06F 9/30* (2018.01)

(52) U.S. Cl.
CPC .................. *G06F 9/30058* (2013.01)

(58) Field of Classification Search
CPC . G06F 9/30058; G06F 9/3005; G06F 9/30054
See application file for complete search history.

(56) References Cited

U.S. PATENT DOCUMENTS

| | | | |
|---|---|---|---|
| 5,835,972 A | 11/1998 | Choate | |
| 5,956,503 A | 9/1999 | Armilli et al. | |
| 6,209,082 B1 | 3/2001 | Col et al. | |
| 6,334,171 B1 | 12/2001 | Hill et al. | |
| 6,360,317 B1* | 3/2002 | Mahalingaiah | G06F 9/30032 712/210 |
| 6,516,408 B1* | 2/2003 | Abiko | G06F 5/01 712/227 |
| 8,219,786 B1 | 7/2012 | Nuechterlein | |
| 2003/0033491 A1 | 2/2003 | Henry et al. | |
| 2003/0120903 A1 | 6/2003 | Roussel | |
| 2004/0073773 A1 | 4/2004 | Demjanenko | |
| 2006/0253654 A1 | 11/2006 | Adachi | |
| 2007/0260855 A1 | 11/2007 | Gschwind et al. | |
| 2012/0054560 A1* | 3/2012 | Adir | G06F 11/3664 714/54 |
| 2012/0117323 A1 | 5/2012 | Cypher et al. | |
| 2012/0272043 A1 | 10/2012 | Nuechterlein | |
| 2013/0262839 A1 | 10/2013 | Gschwind et al. | |

OTHER PUBLICATIONS

Hennessy and Patterson, Computer Architecture A Quantitative Approach, Sep. 16, 2011, Morgan Kaufmann, 5th edition, 7 pages.*
Sudhakar, ProAptiv: Efficient Performance on a Fully-Synthesizable Core, Aug. 28, 2012, MIPS Technologies, 27 pages, [retrieved from the internet on Sep. 8, 2015], retrieved from URL <http://www.hotchips.org/wp-content/uploads/hc_archives/hc24/HC24-1-Microprocessor/HC24.28.131-proAptiv-Sudhaker-MIPS-2.pdf>.*

(Continued)

*Primary Examiner* — Jyoti Mehta
(74) *Attorney, Agent, or Firm* — Adam Intellex, PLC

(57) ABSTRACT

A processor is configured to identify a branch instruction immediately followed by an architectural delay slot. A single bonded instruction comprising the branch instruction immediately followed by the architectural delay slot is created. The single bonded instruction is loaded into an instruction buffer.

10 Claims, 1 Drawing Sheet

(56) References Cited

OTHER PUBLICATIONS

Slane, Delayed Branches with Packed Instruction Stream, Jun. 1, 1999, 2 pages, [retrieved from the internet on Sep. 8, 2014]; retrieved from URL <http://priorart.ip.com/IPCOM/000123879>.*
Michael Steil, Having fun with Branch Delay Slots, Nov. 22, 2009, 9 pages, [retrieved from the internet on Sep. 1, 2015], retrieved from URL <http://www.pagetable.com/?p=313>.*
J. Scott Gardner, MIPS Aptiv cores hit the mark, May 28, 2012, MPROnline, 6 pages, [retrieved from the internet on Sep. 1, 2015], retrieved from URL <http://panchul.com/dropbox/2012_11_19/P10900_aptiv.pdf>.*
Andrew S Tanenbaum, Structured Computer Organization, 1984, Prentice-Hall, Second edition, 5 pages.*
MIPS Architecture for Programmers vol. II-A: The MIPS32 Instruction Set, Mar. 25, 2010, MIPS Technologies, Revision 3, 348 pages, [retrieved from the internet on Sep. 8, 2015], retrieved from URL <http://www.t-es-t.hu/download/mips/md00086c.pdf>.*
Hot Chips: A symposium on high performance chips, 13 pages, [retrieved from the internet on Jan. 4, 2016], retrieved from URL <http://www.hotchips.org/archives/2010s/hc24/>.*
Kenneth C. Yeager, The MIPS R10000 superscalar microprocessor, 1996, IEEE Micro, 0272-1732/96, 13 pages.*
Don't we all need ARMs? An introduction to the ARM system architecture, Jul. 12, 2009, 2 pages, [retrieved from the internet on Nov. 10, 2016], retreived from URL <www.cs.umd.edu/class/fall2001/cmsc411/proj01/arm/home.html>.*
Fog, "The Microarchitecture of Intel, AMD and VIA CPUs, An Optimization Guide for Assembly Programmers and Compiler Makers", Copenhagen University College of Engineering, Feb. 29, 2012, Third in Series of 5 Manuals, Section 7.5, 6 pgs., www.agner.org/optimize/microarchitecture.pdf.
Search Report issued to corresponding GB Patent Application No. 1402832.8, dated Jul. 21, 2014, 5 pgs.
Exam Report issued to GB Application No. 1402832.8, dated Apr. 14, 2015, 3 pgs.

* cited by examiner

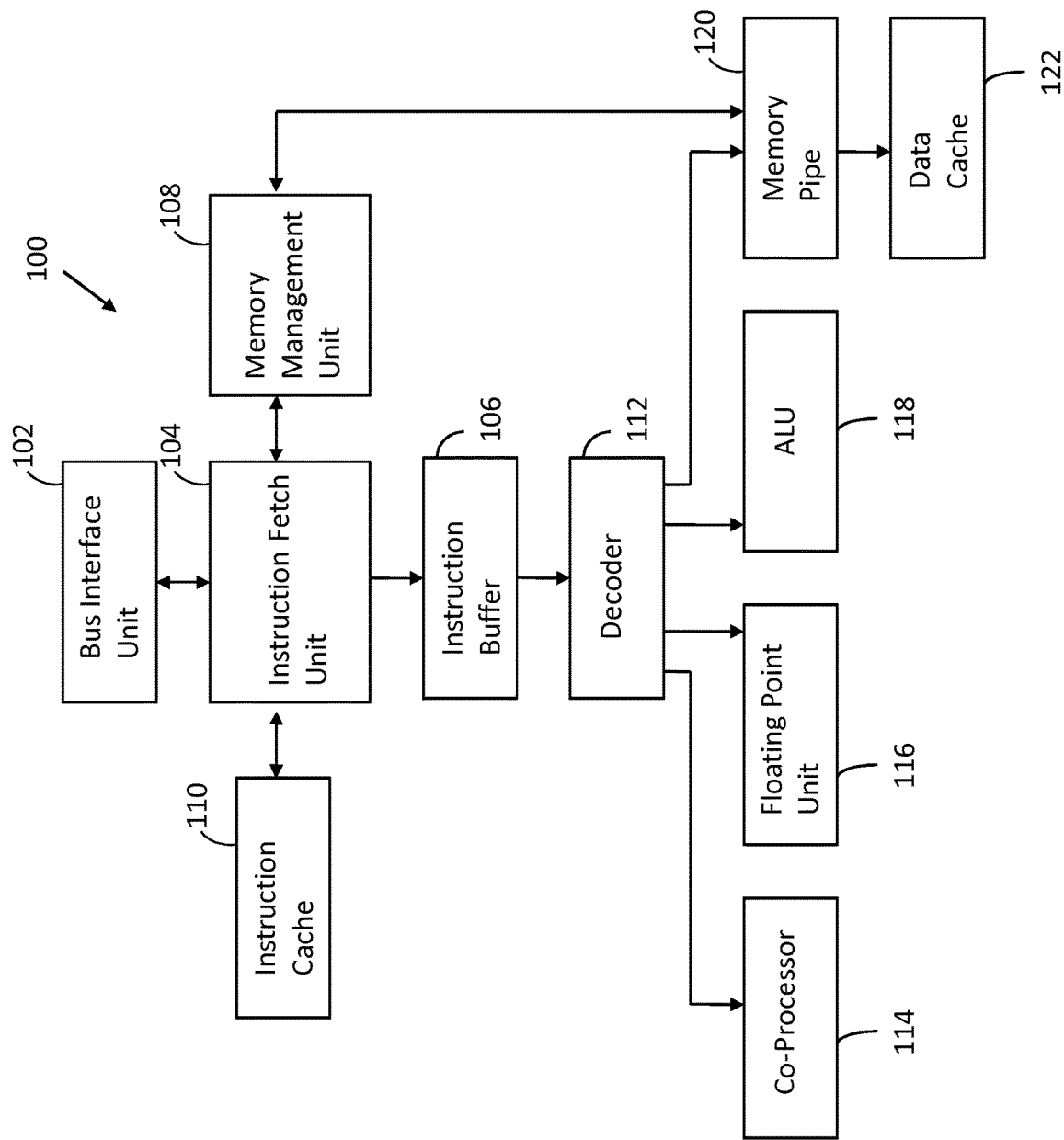

APPARATUS AND METHOD FOR BONDING BRANCH INSTRUCTION WITH ARCHITECTURAL DELAY SLOT

FIELD OF THE INVENTION

This invention relates generally to computer architectures. More particularly, this invention relates to processor architectures with branch instruction bonding.

BACKGROUND OF THE INVENTION

Superscalar processors dispatch more than one instruction per cycle to improve performance. Unfortunately, such superscalar designs require escalating hardware costs that dilute the benefits of building wider processors. The problem is aggravated in speculative (typically out-of-order) processors that operate by dispatching more instructions per cycle than can be sustainably graduated. The problem is further exacerbated by Reduced Instruction Set Computer (RISC) instruction sets, which have very simple instructions but consequently require even wider machines to compete with corresponding Complex Instruction Set Computer (CISC) machines.

This is a significant problem in many microprocessors, but the problem is particularly acute in synthesized processors, where the frequency loss of building a wider machine can rival the throughput gain of doing so. Since frequency loss affects all programs and throughput gain only affects some, there is greater likelihood of an overall performance loss (because performance=throughput*frequency). Any method to obtain the benefits of higher throughput without hurting frequency are therefore welcome. A typical RISC processor usually has about 15% more dynamic instructions in the code stream to perform the same program as a comparable CISC processor. This instruction bloat does not hurt performance in the low-performance domain because the shorter pipelines and higher frequency benefits of RISC outweigh any instruction throughput disadvantages due to the code expansion. However, when striving for higher performance targets, a RISC processor must be designed to process more instructions per cycle. For example, the performance of a 3-wide CISC processor that can dispatch and graduate 3 instructions per cycle could not be equaled by a 3-wide RISC processor. Rather, a 4-wide RISC processor is required. This strategy works fine in a power-unconstrained industry, but the extra power of a 4 channel versus a 3 channel processor can be intolerable in power-sensitive markets.

It is well known that increasing dispatch width (i.e., degree of superscalarity of a processor) causes quadratic increases in register renamer complexity and area. Increasing dispatch width can also compromise frequency proportionally. Thus, any technique that can reduce the pressure to build a wider machine is welcome. In other words, it would be desirable to provide a technique to increase dispatch bandwidth in a RISC machine without the use of additional processing channels.

SUMMARY OF THE INVENTION

A processor is configured to identify a branch instruction immediately followed by an architectural delay slot. A single bonded instruction comprising the branch instruction immediately followed by the architectural delay slot is created. The single bonded instruction is loaded into an instruction buffer.

A non-transitory computer readable storage medium includes executable instructions to define a processor configured to identify a branch instruction immediately followed by an architectural delay slot. A single bonded instruction comprising the branch instruction immediately followed by the architectural delay slot is created. The single bonded instruction is loaded into an instruction buffer.

BRIEF DESCRIPTION OF THE FIGURES

The invention is more fully appreciated in connection with the following detailed description taken in conjunction with the accompanying drawings, in which:

FIG. 1 illustrates a processor configured in accordance with an embodiment of the invention.

Like reference numerals refer to corresponding parts throughout the several views of the drawings.

DETAILED DESCRIPTION OF THE INVENTION

FIG. 1 illustrates a processor 100 configured in accordance with an embodiment of the invention. The processor 100 implements branch instruction bonding operations described herein. In particular, the processor bonds a branch instruction followed by an architectural delay slot (e.g., a no-operation instruction) into a single entity. As discussed below, this increases dispatch bandwidth at minimal cost.

The processor 100 includes a bus interface unit 102 connected to an instruction fetch unit 104. The instruction fetch unit 104 retrieves instructions from an instruction cache 110. The instruction fetch unit 104 is configured to identify branch instruction bonding opportunities. When such an opportunity exists, a branch instruction is bonded with a delay slot to form a single entity, which is written to the instruction buffer 106.

The memory management unit 108 provides virtual address to physical address translations for the instruction fetch unit 104. The memory management unit 108 also provides load and store data reference translations for the memory pipe (load-store unit) 120.

A decoder 112 retrieves instructions from the instruction buffer 106. The decoder 112 applies a decoded instruction to a functional unit, such as a co-processor 114, a floating point unit 116, an arithmetic logic unit (ALU) 118 or a memory pipe 120, which processes load and store addresses to access a data cache 122.

Many RISC Instruction Set Architectures (ISAs), such as processors sold by MIPS Technologies®, Inc., Sunnyvale, Calif., have an architectural delay slot, wherein the instruction following a branch is always executed. This allows certain branch and successor instructions to be treated as one compound instruction in the dispatch stage. This increases dispatch width and performance at lower complexity and overhead than building a wider machine.

Branch instruction fusion is utilized in certain CISC processors sold by Intel® Corporation, Santa Clara, Calif. Branch instruction fusion occurs when a compare instruction that sets a condition-code is combined with an immediately following branch instruction that reads the condition code. Branch instruction fusion is performed to reduce branch resolution and thus misprediction latency. Therefore, branch instruction fusion involves fused instructions, where the branch is the second instruction in the fused entity. In contrast, with the disclosed branch bonding, the branch instruction is the first instruction in the fused entity.

A microprocessor instruction set usually has two classes of control transfer instructions—branches and jumps. Branches are typically conditional and specify the target relative to the Program Counter (PC) of the branch. The branch condition is usually obtained directly from a condition-code/condition/general-purpose register or by performing a specific relative comparison between two general-purpose registers. In the former case, jumps are unconditional and typically specify the target either as an absolute address or as an indirect address residing in an architectural register. Some jumps that are used for invoking a subroutine call may also write a link register, but these are a minority of all the branches and jumps put together. Hereinafter, all types of control transfer instructions are referred to as "branches".

Branches typically write zero or at most one register and typically read zero (on a condition-code ISA), one or very rarely two registers. Now consider the typical RISC instruction set that is followed by one architectural delay slot after every branch. Under certain conditions, this allows one to bond together the branch and its delay slot into one compound instruction for dispatch purposes. This is because the delay slot instruction is always executed, irrespective of the taken or not-taken outcome of the branch. This guarantees that if the branch is executed, so will the delay slot and vice-versa. This enables the machine to statically bond branches very early in the pipeline without knowing or predicting the direction of the branch. In fact, as discussed above, branch bonding occurs in the instruction fetch unit 104 immediately after instructions are fetched from the instruction cache 110. Thus, the disclosed branch bonding occurs even before branches are predicted.

The bonded instruction is written into the instruction buffer 106 as one entity rather than two. As a result, branch bonding also gives the illusion of a larger instruction buffer, scheduler, reorder buffer etc. since some entries are really holding two program instructions rather than one. If one were to simply bond any branch with its delay slot, one could end up with a compound instruction that required more ports than a normal instruction. For example, in the MIPS Technologies® architecture, a jump and link instruction (JAL) bonded with an ADD would need 3 read and 2 write ports, much more than the usual 2 read and 1 write port. However, it is not common to require more than 2 read ports or 1 write port after bonding. Most branches do not write to any register. A large percentage of delay slots are occupied by NOP (no-operation) instructions, which do not read or write any registers.

Another common delay slot instruction is an ALU operation which writes one register. A good proportion of such ALU instructions read only one register or if they do read two registers, one may be the same as that read by the branch itself. As a result, when looking at the branch and delay slot together, it is frequently the case that the combination writes at most one register and reads two or fewer registers. This 2-read/1-write port requirement is no greater than an ordinary ALU operation, which means that the branch and the delay slot can be bonded together and travel as one instruction through the dispatch and graduate stages without increasing the number of read and write resources in the decode and dispatch pipe stage, such as the register renamer.

Thus, the invention effectively boosts dispatch and graduation bandwidth with minimal hardware investment. It has broad applicability to any general-purpose processor with a RISC ISA that has delay-slots, irrespective of issue width, pipeline depth or degree of speculative execution. It requires no change in the instruction set, which makes it applicable to all existing binaries. It can also be applied to non-delay-slot ISAs, but then the bonding decision must occur after the branch is not taken and the bonding must be reversible in case the branch is taken.

Those skilled in the art will appreciate that the invention is not difficult to implement, which is one of its main attractions. When applied to wide superscalar processors, this invention may result in diminished benefits because more than one pair of instructions may need bonding in the same cycle, which hurts frequency because it complicates insertion into the instruction buffer. The traditional approach in such cases is to limit the number of bonded instructions that can be generated per cycle. Those skilled in the art will appreciate that the invention has particular value in the synthesizable core industry, where wider processors incur disproportionate frequency and power costs.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known non-transitory computer usable medium such as semiconductor, magnetic disk, or optical disc (e.g., CD-ROM, DVD-ROM, etc.). It is understood that a CPU, processor core, microcontroller, or other suitable electronic hardware element may be employed to enable functionality specified in software.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

What is claimed is:

1. A processor in electronic hardware, comprising:
   an instruction buffer; and
   an instruction fetch unit connected to the instruction buffer, the instruction fetch unit configured to:
   identify a branch instruction immediately followed by an architectural delay slot;
   create a single bonded instruction comprising the branch instruction immediately followed by the architectural delay slot; and
   load the single bonded instruction into the instruction buffer, wherein the processor is configured to process the single bonded instruction as a single instruction in a dispatch pipe stage, wherein the single bonded instruction is created before branch direction prediction of the branch instruction and wherein the processor is configured as a Reduced Instruction Set Computer (RISC) processor.

2. The processor of claim 1 wherein the architectural delay slot is an instruction that is performed unconditionally.

3. The processor of claim 1 wherein the architectural delay slot is a no operation instruction.

4. The processor of claim 1 further comprising a decoder to retrieve the single bonded instruction from the instruction buffer.

5. The processor of claim 1 wherein the processor is configured to process the single bonded instruction as a single instruction in a graduate pipe stage.

6. A non-transitory computer readable storage medium comprising executable instructions to define a processor configured to:
- identify a branch instruction immediately followed by an architectural delay slot;
- create a single bonded instruction comprising the branch instruction immediately followed by the architectural delay slot;
- load the single bonded instruction into an instruction buffer; and
- process the single bonded instruction as a single instruction in a dispatch pipe stage, wherein the single bonded instruction is created before branch direction prediction of the branch instruction and wherein the processor is configured as a Reduced Instruction Set Computer (RISC) processor.

7. The non-transitory computer readable storage medium of claim 6 wherein the processor is configured to include an instruction fetch unit configured to identify the branch instruction, create the single bonded instruction and load the single bonded instruction.

8. The non-transitory computer readable storage medium of claim 6 wherein the architectural delay slot is an instruction that is performed unconditionally.

9. The non-transitory computer readable storage medium of claim 6 wherein the architectural delay slot is a no operation instruction.

10. The non-transitory computer readable storage medium of claim 6 wherein the processor is configured to include a decoder to retrieve the single bonded instruction from the instruction buffer.

* * * * *